US005498190A

United States Patent [19]
Ganson

[11] Patent Number: 5,498,190
[45] Date of Patent: Mar. 12, 1996

[54] FLEXIBLE FOAM CONSTRUCTION TOY AND METHOD OF MANUFACTURING SAME

[75] Inventor: Arthur M. Ganson, Somerville, Mass.

[73] Assignee: HandsOnToys, Inc., Woburn, Mass.

[21] Appl. No.: 265,809

[22] Filed: Jun. 27, 1994

[51] Int. Cl.$^6$ .......................... A63H 33/04; A63H 33/08; A63H 33/00
[52] U.S. Cl. .............................. 446/107; 446/85; 446/486
[58] Field of Search ................................ 446/107, 85, 87, 446/116, 119, 370, 373, 374, 486, 490, 488; 273/84 R, 67 R, 72 R, DIG. 4, DIG. 8; 482/83; 434/278, 279, 281; 132/246

[56] References Cited

U.S. PATENT DOCUMENTS

| | | | |
|---|---|---|---|
| 2,392,024 | 1/1946 | Couri | 446/374 |
| 3,236,007 | 2/1966 | Abeson | 446/374 |
| 3,395,484 | 8/1968 | Smith | 446/374 |
| 3,565,434 | 2/1971 | Liston | 273/DIG. 4 X |
| 3,830,898 | 8/1974 | Johnson et al. | 446/374 X |
| 3,918,196 | 11/1975 | Schleich | 446/107 |
| 4,136,484 | 1/1979 | Abrams | 446/370 |
| 4,540,006 | 9/1985 | Collis | 132/246 |
| 4,666,417 | 5/1987 | Hillman | 446/267 |
| 4,823,458 | 4/1989 | Hollenberg et al. | 132/246 X |
| 4,830,364 | 5/1989 | Wexler | 446/240 X |
| 5,165,428 | 11/1992 | Stohr | 132/246 |
| 5,310,376 | 5/1994 | Mazuzumi et al. | 466/107 |

FOREIGN PATENT DOCUMENTS

| | | | |
|---|---|---|---|
| 3089109 | 4/1988 | Japan | 132/246 |
| 656087 | 8/1951 | United Kingdom | 446/374 |
| 1253810 | 11/1971 | United Kingdom | 446/374 |
| 2116032 | 9/1983 | United Kingdom | 132/246 |

Primary Examiner—Mickey Yu
Assistant Examiner—D. Neal Muir
Attorney, Agent, or Firm—Brian M. Dingman

[57] ABSTRACT

A flexible foam construction toy, comprising: an elongated foam body having a central aperture with a first diameter; a flexible wire, with a second diameter approximately equal to the first diameter, ±20%, and located along the central aperture of the foam body such that its ends are within a distance no greater than the diameter of the foam body (or the diameter of the largest circle that can be drawn completely within a non-cylindrical foam body) from either end of the foam body; and adhesive between the wire and the foam body for assisting to maintain the wire within the foam body.

12 Claims, 9 Drawing Sheets

FIG. IOA

FIG. IOB​ ​ ​ ​ FIG. IOC​ ​ ​ ​ FIG. IOD

FLEXIBLE FOAM CONSTRUCTION TOY AND METHOD OF MANUFACTURING SAME

FIELD OF INVENTION

This invention relates to a flexible foam construction toy that can be bent in a variety of shapes.

BACKGROUND OF INVENTION

One type of child's construction toy is a type which consists of a number of interconnectable pieces. Often these pieces are rigid. Sometimes the pieces have the interconnection structures built therein, and other times there are separate pieces that act to interconnect other pieces. Although these rigid toy pieces have great variety, the child is limited by the particular size and shape of the pieces of the construction toy set.

Some such interconnectable construction toy sets use flexible pieces. One such toy uses plastic-coated wire pieces with special end designs which allow the pieces to be interconnected. Even this limits the child's use of the toy, however, as the pieces are not adapted to be interconnected at places other than their ends. Additionally, the relatively thick wire and relatively dense plastic coating are sufficiently massive that they effectively limit the size of the toy pieces.

SUMMARY OF INVENTION

It is therefore an object of this invention to provide a construction toy which can be used to make virtually any shape of any size.

It is a further object of this invention to provide such a construction toy in which the toy pieces can be interconnected anywhere along their lengths.

It is a further object of this invention to provide such a construction toy in which the toy pieces can be directly interconnected, or interconnected with separate interconnection pieces.

It is a further object of this invention to provide such a construction toy in which the pieces are extremely light so that they can be made very large and/or long.

This invention results from the realization that a superior construction toy may be accomplished by making different toy shapes out of extruded foam with a relatively thin, flexible wire inserted in a central aperture in the foam piece and held therein with adhesive and with enlarged ends which inhibit piercing of the foam by the wire ends.

This invention features a flexible foam construction toy, comprising: an elongated foam body having a central aperture with a first diameter; a flexible wire, with a second diameter approximately equal to the first diameter, ±20%, and located along the central aperture of the foam body such that the wire ends are each within a distance no greater than the diameter of the foam body (or the diameter of the largest circle that can be drawn completely within a non-cylindrical foam body) from either end of the foam body; and adhesive means between the wire and the foam body for assisting to maintain the wire within the foam body. The wire may include enlarged ends, with a third diameter greater than the second diameter. The enlarged ends may be integral with the wire, or may be separate structures bound to the ends of the wire. The wire is preferably aluminum, and may be 0-temper aluminum.

The adhesive means may include heat, glue, epoxy, heat activated adhesive or other adhesives. The foam body may be made from polyurethane or polyethylene with or without additives. The ends of the foam body may be sealed or capped to assist in keeping the wire in the aperture. The wire may have a diameter between 1/32" and 1/2". The size of the wire adheres to the following principal: The ratio of the foam OD to the diameter of the wire will range from 4:1 to 20:1 for a 2.5 lb per cubic foot (pcf) foam. The upper range of this ratio will change as the foam density changes by a factor of: 2.5/density of foam used. For example a 1.25 lb pcf foam would have the ratio of 4:1 to 2.5/1.25×20:1 or 40:1. A 5 lb pcf foam would have the ratio of 2:1 to 10:1. In the case of non-cylindrical bodies, the measurement used for this ratio should be the diameter of the largest circle that can be drawn completely within the figure.

In a more specific embodiment, this invention features a flexible foam construction toy, comprising: an elongated foam body having a central aperture with a first diameter, and sealed ends; a flexible wire, with a second diameter of at least 1/32", and approximately equal to the first diameter, ±20%, and located along the central aperture of the foam body; enlarged wire ends fixed to or integral with both ends of the wire, and ending within a distance no greater than the diameter of the foam body (or the diameter of the largest circle that can be drawn completely within a non-cylindrical foam body) from either end of the foam body; and adhesive between the wire and the foam body for assisting to maintain the wire within the foam body.

Also featured is a method of manufacturing a flexible foam construction toy, comprising the steps of: extruding an elongated foam shape, having a central aperture with a first diameter; providing a piece of flexible wire; substantially coating the wire or the internal aperture of the foam with an adhesive; inserting the wire into the central aperture of the foam shape so that the wire is within the foam shape; and closing off the ends of the foam shape to assist in maintaining the wire within the foam shape. The length of the wire may be equal to that of the foam shape or shorter or longer than the foam shape by a distance no greater than the diameter of the foam body (or the diameter of the largest circle that can be drawn completely within a non-cylindrical foam body). The method may further include the step of enlarging the wire ends before insertion into the foam shape, which may be accomplished by balling the wire at its ends, or by fixing enlarged structures to the ends of the wire. If a heat activated adhesive is used, it can be reactivated by heating with hot air, or by heating the metal wire with rf induction.

BRIEF DESCRIPTION OF THE DRAWINGS

Other objects features and advantages will occur to those skilled in the art from the following description of preferred embodiment, and the accompanying drawings, in which.

DESCRIPTION OF THE PREFERRED EMBODIMENTS

Figure 1:
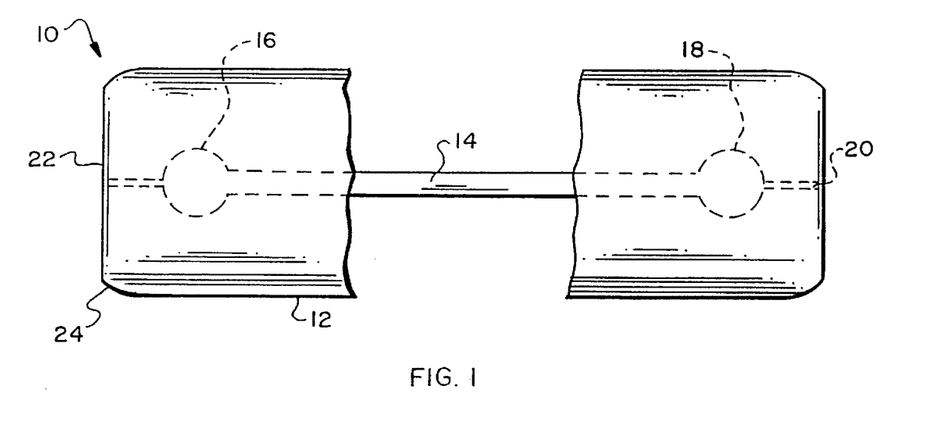
FIG. 1 is a side view of one form of a flexible foam construction toy according to this invention with a portion of the toy removed to detail the interior structure.
Figure 2:
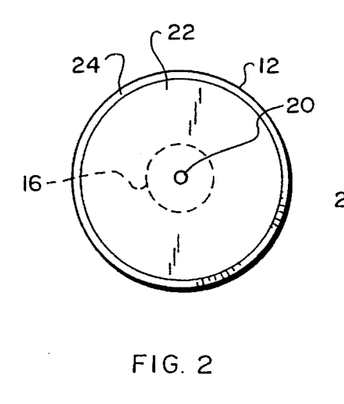
FIG. 2 is an end view of the toy of FIG. 1.
Figure 3:
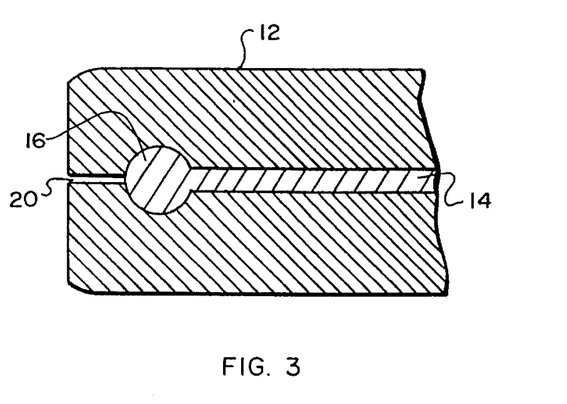
FIG. 3 is a partial cross sectional view of the toy of FIG. 1.

There is shown in FIGS. 1 through 3 flexible foam construction toy 10 according to this invention. Toy 10 is made from an elongated foam body 12 having central aperture 20 which is typically approximately 1/32" to 1/2" in diameter. The foam body can take a variety of shapes as illustrated in FIGS. 7 through 11, for example. Flexible wire 14 having enlarged ends 16 and 18 is embedded within body 12 along aperture 20. Wire 14 is preferably zero-temper aluminum wire having a thickness between 1/32" and 1/2". The size of the wire adheres to the following principal: The ratio of the foam 0D to the diameter of the wire will range from 4:1 to 20:1 for a 2.5 lb per cubic foot (pcf) foam. The upper range of this ratio will change as the foam density changes by a factor of: 2.5/density of foam used. For example a 1.25 lb pcf foam would have the ratio of 4:1 to 2.5/1.25×20:1 or 40:1. A 5 lb pcf foam would have the ratio of 2:1 to 10:1. In the case of non-cylindrical bodies, the measurement used for this ratio should be the diameter of the largest circle that can be drawn completely within the figure. Enlarged ends 16 and 18 in this case are formed by enlarging the wire ends, for example by balling the ends in a coining or molding process.

Toy 10 is manufactured first by extruding foam body 12 and cutting off the extrusion to the desired length. The foam is preferably polyurethane or polyethylene with or without additives. This material has enough flexibility to allow wire 14, including enlarged ends 16 and 18, to be inserted into aperture 20. Before wire 14 is inserted in the aperture, it or the aperture is coated with an adhesive such as a glue, epoxy, heat activated adhesive or other adhesives to assist in maintaining the wire in place within body 12. If a heat-activated adhesive is used, it can be activated by placing the toy in an oven, or by heating the metal wire by rf induction.

It has been found that the ends of wire 14 should be within a distance equal to the diameter of a cylindrical foam body, or the diameter of the largest circle that can be drawn completely within a non-cylindrical foam body, from the ends of body 12. To further assist in maintaining wire 14 in place and preventing it from puncturing body 12 or slipping out one of the ends of aperture 20, body 12 is preferably closed off after the wire is inserted. If the ends are sealed, the result is that the body ends such as end 22 are slightly smaller than the diameter of the remainder of body 12. This sealing serves to help close off the open ends of aperture 20 and may be achieved with heat, glue, epoxy, heat activated adhesive, or other adhesives.

Figure 4:
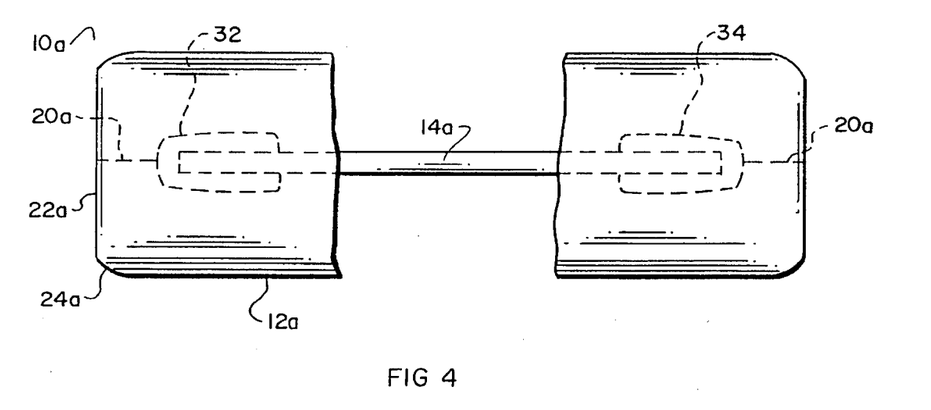
FIG. 4 is a view similar to that of FIG. 1 for another style of flexible foam construction toy according to this invention.
Figure 5:
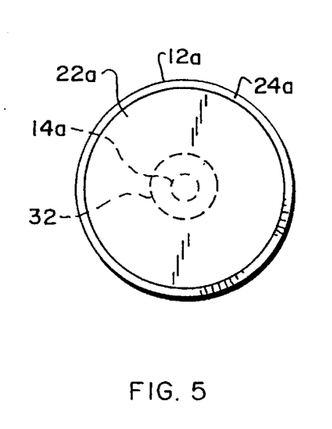
FIG. 5 is an end view of the toy of FIG. 4.
Figure 6:
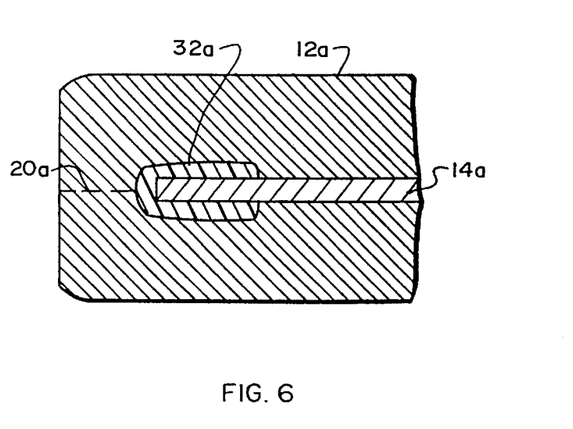
FIG. 6 is a partial cross sectional view of the toy of FIG. 4.

An alternative construction of toy 10a is shown in FIGS. 4 through 6. Wire 14a is provided with enlarged ends in this case by sealing or gluing caps 32 and 34 on the ends of the wire. These caps may be similar to wire nuts. Another type of enlarged end is made by looping the ends back on themselves. The construction may also be accomplished with two half foam pieces (such as half-circular cross-section) with a central channel, into one of which wire 14a is laid before the halves are adhered together, leaving seam 20a.

Figure 7:
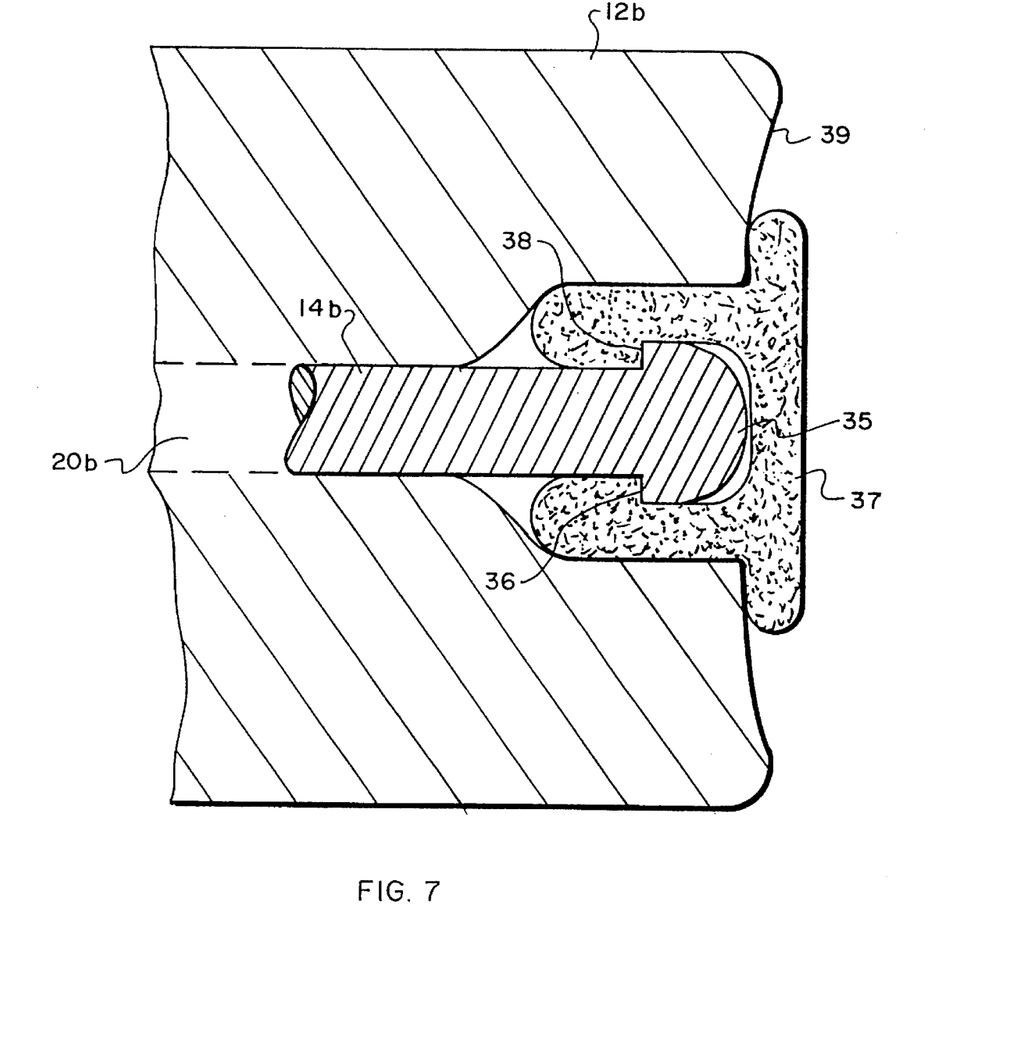
FIG. 7 is a cross-sectional view of another embodiment, detailing a manner of closing off the end of the foam body with a cap.

FIG. 7 details another manner of closing off the ends of the foam body to prevent the wire from poking out through the ends. This method can also be used to cap wire ends when the wire is longer than the foam body. Wire 14b has enlarged end 35 which can be formed by stamping. After wire 14b is inserted in channel 20b in the center of foam body 12b, plastic end cap 37 is fitted over the end of wire 14b. Cap 37 has shoulder 38 that snaps over and mates with corresponding shoulder 36 of wire 14b to keep cap 37 on the end of wire 14b.

Figure 8A:
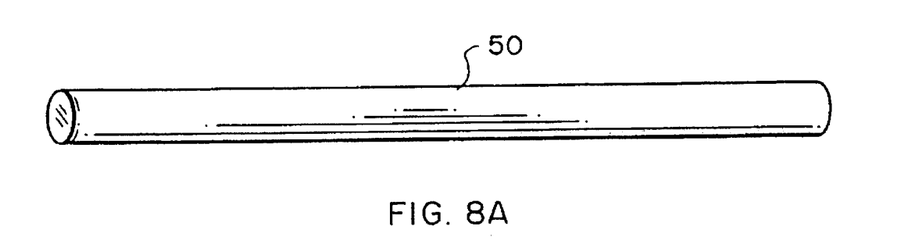
FIGS. 8A through 8D are an unbent and three bent shapes, respectively, of a flexible foam construction toy according to this invention having a circular cross section.
Figure 8B:
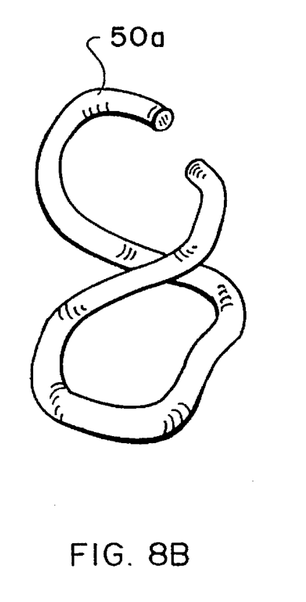
Figure 8C:
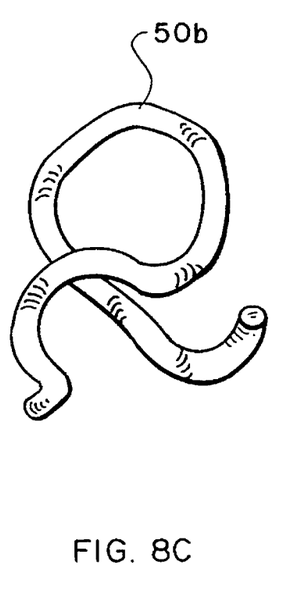
Figure 8D:
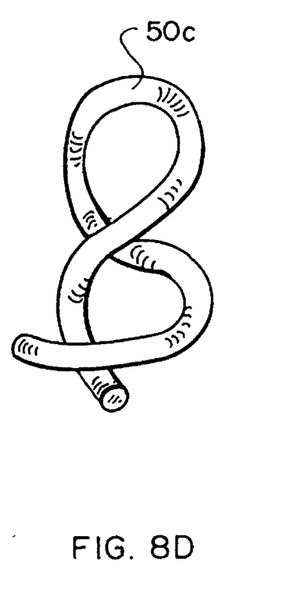
Figure 9A:
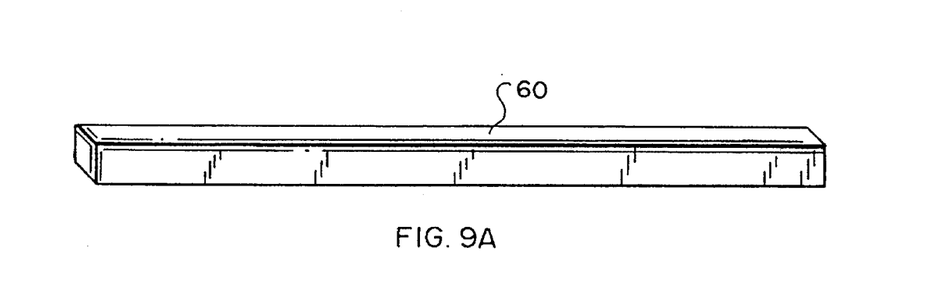
FIGS. 9A through 9D are similar views for a toy having a square cross section.
Figures 9B, 9C, 9D:
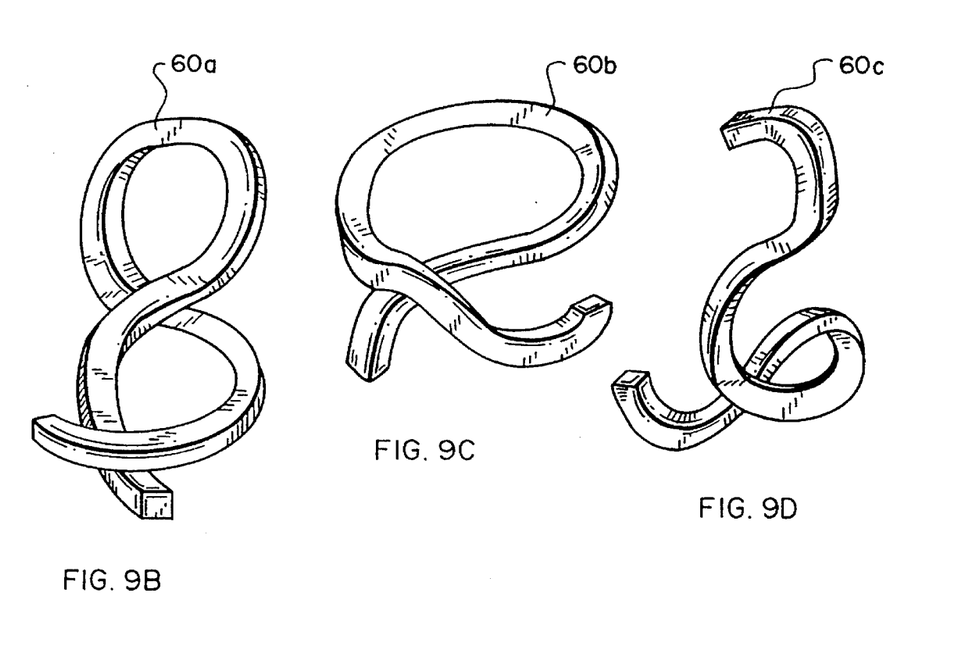
Figure 10A:
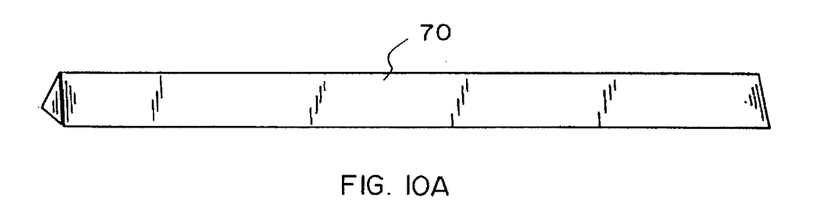
FIGS. 10A through 10D are similar views for a toy having a triangular cross section.
Figure 10B:
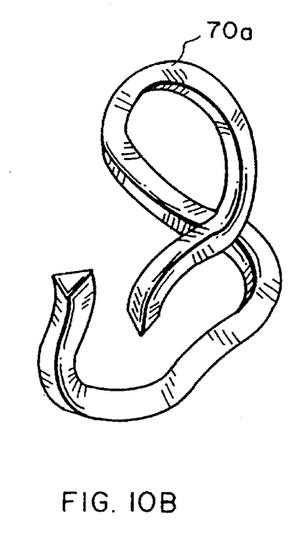
Figure 10C:
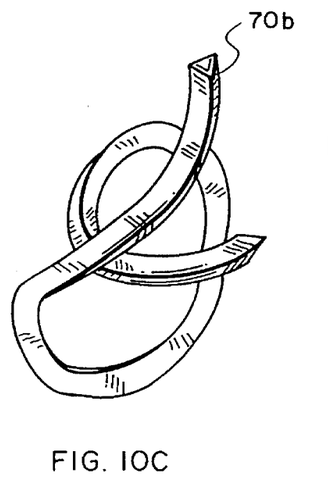
Figure 10D:
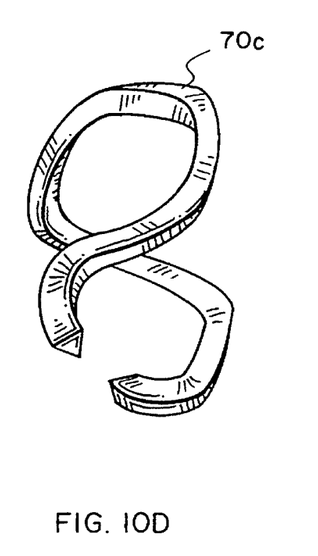
Figure 11A:
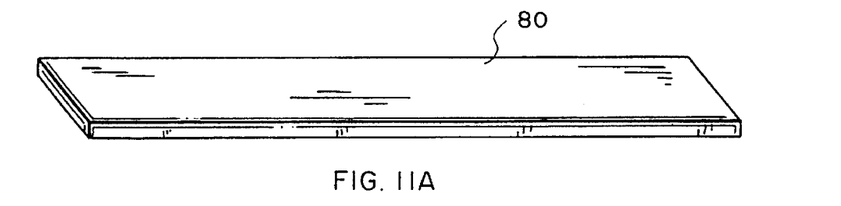
FIGS. 11A through 11D are similar views for a toy having a rectangular cross section.
Figure 11B:
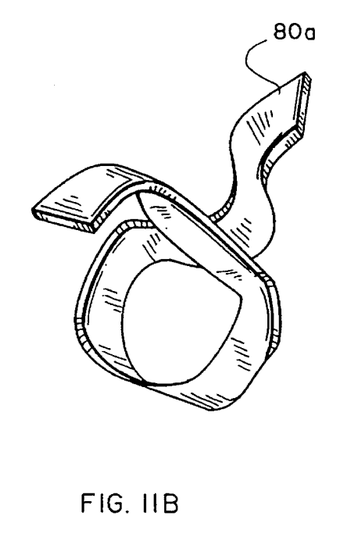
Figure 11C:
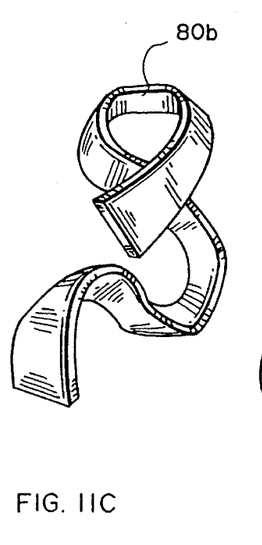
Figure 11D:
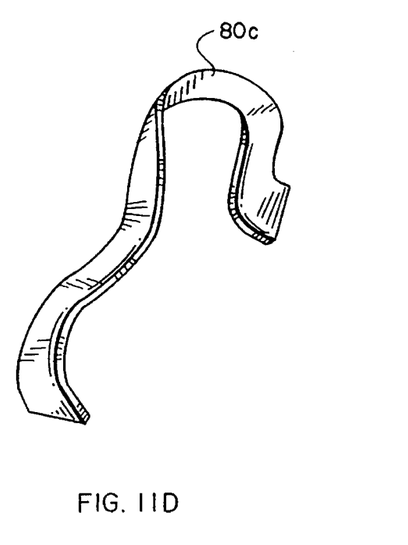
Figure 12A:
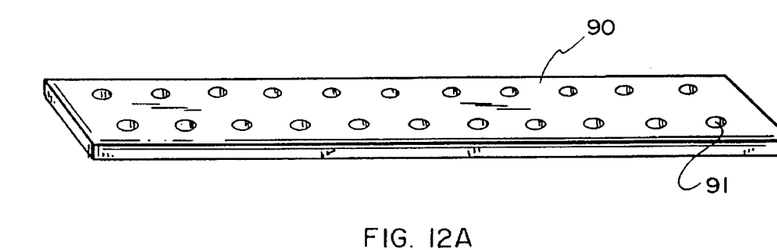
FIGS. 12A through 12D are similar views for a toy having a rectangular cross section and holes therethrough.
Figure 12B:
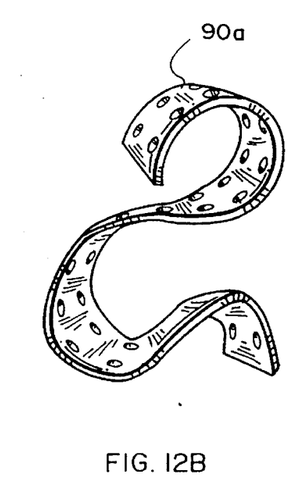
Figure 12C:
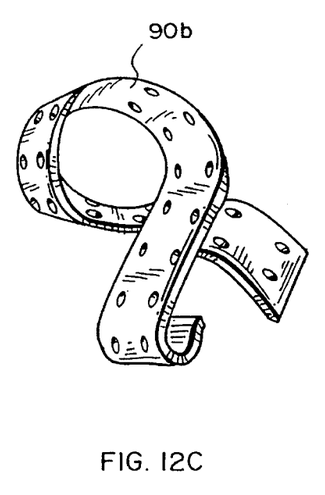
Figure 12D:
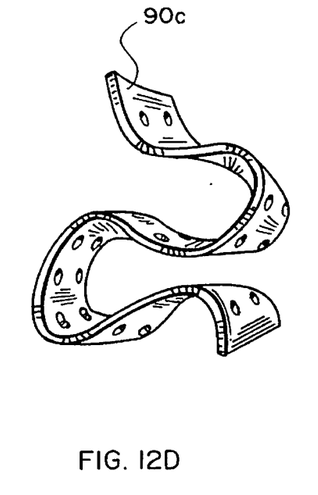

The foam construction toy of this invention can take any one or more of virtually unlimited shapes. In manufacturing, it is advantageous to choose shapes which may be extruded. One shape is a circular tube 50 through 50c, FIGS. 8A through 8D. FIGS. 8B and 8D illustrate three of a virtually unlimited number of shapes which that toy may be bent into. Similar drawings are shown for tubes 60 through 60c with a square cross section, FIGS. 9A through 9D; tubes 70 through 70c with a triangular cross section, FIGS. 10A through 10D; rectangular bars 80 through 80c with a rectangular cross section, FIGS. 11A though 11D; and rectangular bars 90 through 90c, FIGS. 12A through 12D, which have a rectangular cross section and include a number of through-holes such as hole 91 which allow this piece to be connected to the tube-shaped pieces by passing the tubes through the holes.

Figure 13:
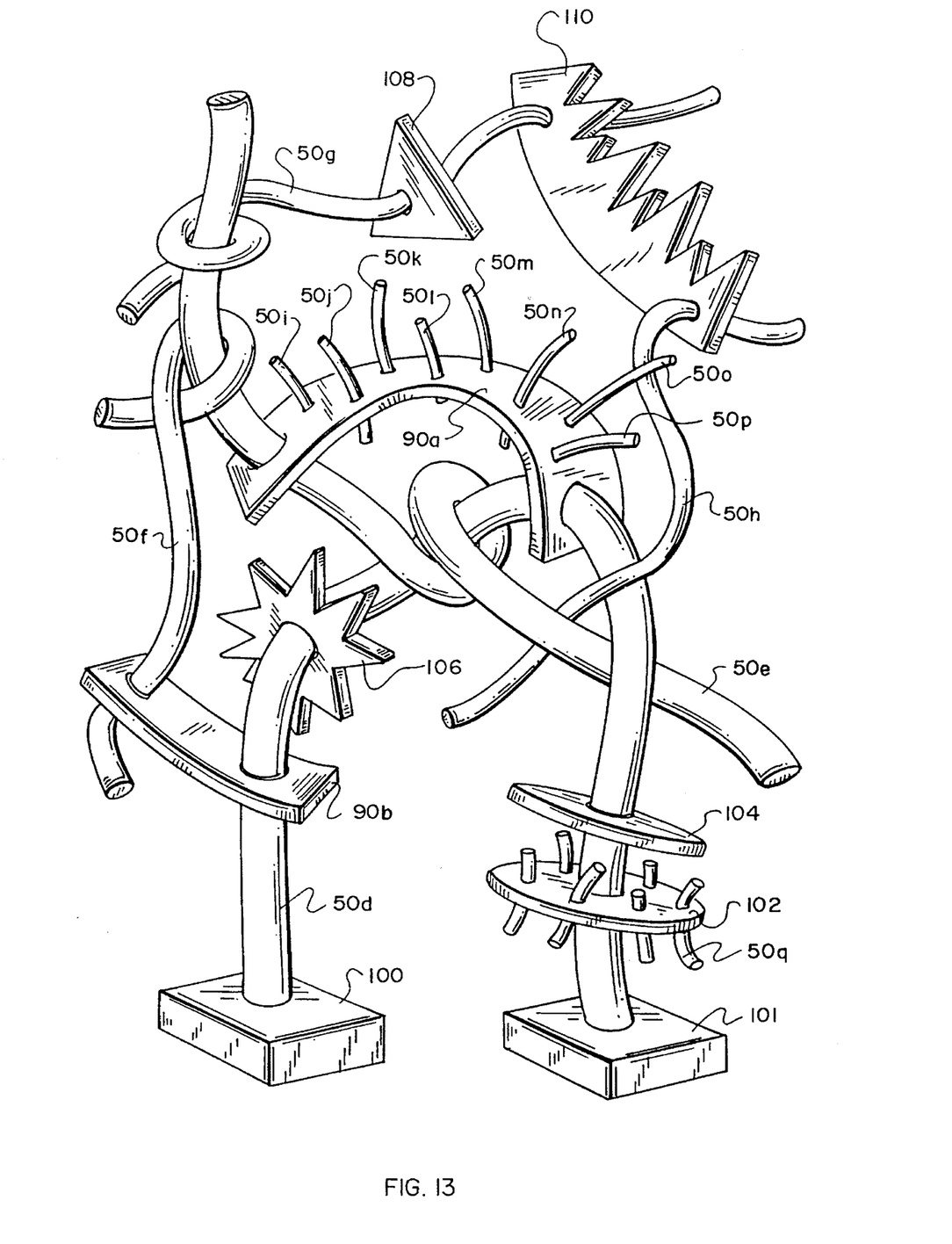
FIG. 13 is a view of many pieces put together to form a fanciful construction.

FIG. 13 is a drawing of a fanciful assembly made with a number of flexible foam construction toy pieces according to this invention. Rectangular base pieces 100 and 101 have a cylindrical hole for supporting cylindrical pieces 50d and 50e which in turn support the other pieces, including rectangular bars 90a and 90b which have through holes as shown, disk-shaped pieces 102 and 104 which may have holes for holding cylindrical pieces such as 50q, longer cylindrical pieces 50f through 50h, shorter cylindrical pieces 50i through 50p, star-shaped piece 106, triangular piece 108, and sawtooth piece 110 which may have one or more holes adapted to receive another piece of the set to allow the user to create myriad fanciful designs.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A flexible foam construction toy set including a number of elongated bendable tubular toy pieces that are interconnectable by wrapping around one another, at least one said toy piece comprising:

an elongated regularly-shaped foam body having ends, with a length to width ratio of at least about thirty six, and having a central full-length aperture with first diameter;

a flexible wire with a second diameter, said second diameter essentially equal to said first diameter, wherein said wire has two enlarged ends, is shorter than said foam body, and is located completely within, and along said central aperture of, said foam body; and an adhesive substance between said wire and said foam body to anchor said wire within said foam body;

wherein said foam body ends are closed around said central aperture to fully encapsulate said wire.

2. The flexible foam construction toy set of claim 1 in which the enlarged ends are integral with the wire.

3. The flexible foam construction toy set of claim 1 in which the enlarged ends are separate structures bound to the ends of the wire.

4. The flexible foam construction toy set of claim 3 in which the structures are bound to the wire ends with adhesive.

5. The flexible foam construction toy set of claim 4 in which the structures are sealed on the wire ends.

6. The flexible foam construction toy set of claim 1 in which the wire ends are within a distance equal to the diameter of the largest circle which can be included completely within the foam body of the ends of the foam body.

7. The flexible foam construction toy set of claim 1 in which the wire ends are within a distance no greater than the diameter of the foam body, or the diameter of the largest circle that can be drawn completely within a non-cylindrical foam body, from either end of the foam body.

8. The flexible foam construction toy set of claim 1 in which the wire is aluminum.

9. The flexible foam construction toy set of claim 8 in which the wire is 0-temper aluminum.

10. The flexible foam construction toy set of claim in which the adhesive substance is one of glue, epoxy, and heat activated adhesive.

11. The flexible foam construction toy set of claim 1 in which the foam body is made from polyurethane or polyethylene with or without additives.

12. The flexible foam construction toy set of claim 1 in which the wire has a diameter between 1/32" and 1/2".

\* \* \* \* \*